United States Patent [19]

Peck

[11] Patent Number: 4,481,528

[45] Date of Patent: Nov. 6, 1984

[54] MULTICOLOR IMAGE PRINTING DEVICE AND METHOD

[76] Inventor: Richard M. Peck, 3113 Club Dr., Allentown, Pa. 18103

[21] Appl. No.: 451,364

[22] Filed: Nov. 18, 1982

Related U.S. Application Data

[60] Continuation of Ser. No. 195,281, Oct. 8, 1980, abandoned, which is a division of Ser. No. 85,665, Oct. 17, 1979, abandoned.

[51] Int. Cl.³ .............................................. H04N 1/46
[52] U.S. Cl. ...................................................... 358/75
[58] Field of Search .................................. 358/75, 80

[56] References Cited

U.S. PATENT DOCUMENTS

| | | | |
|---|---|---|---|
| 2,353,877 | 7/1944 | Chollar | 18/53 |
| 2,427,765 | 9/1947 | Chollar | 101/327 |
| 2,777,824 | 1/1957 | Leeds | 260/2.5 |
| 2,864,310 | 12/1958 | Nelson | 101/327 |
| 2,919,645 | 1/1960 | Leeds | 101/368 |
| 3,015,267 | 1/1962 | Dashew | 101/369 |
| 3,022,542 | 2/1962 | Davis | 18/55 |
| 3,055,297 | 9/1962 | Leeds | 101/327 |
| 3,056,384 | 10/1962 | Beale et al. | 118/411 |
| 3,135,828 | 6/1964 | Simjian | 358/75 |
| 3,141,407 | 7/1964 | Leeds | 101/401.1 |
| 3,180,256 | 4/1965 | Kramer et al. | 101/129 |
| 3,217,643 | 11/1965 | Crissy et al. | 101/401.1 |
| 3,336,244 | 8/1967 | Rockoff | 260/2.5 |
| 3,351,948 | 11/1967 | Bonn | 346/76 |
| 3,404,221 | 10/1968 | Loughren | 358/75 |
| 3,415,185 | 12/1968 | Paterson et al. | 101/211 |
| 3,442,209 | 5/1969 | Funahashi | 101/327 |
| 3,578,897 | 5/1971 | Stock | 178/5.2 |
| 3,587,465 | 6/1971 | Bartlett | 101/457 |
| 3,630,729 | 12/1971 | Bach | 96/1.2 |
| 3,724,947 | 4/1973 | Paulus | 355/38 |
| 3,756,718 | 9/1973 | Letzer | 355/32 |
| 3,758,302 | 9/1973 | Grohe | 96/2 |
| 3,971,315 | 7/1976 | Hansen | 101/333 |

FOREIGN PATENT DOCUMENTS

945907  5/1947  France .

*Primary Examiner*—Michael A. Masinick
*Attorney, Agent, or Firm*—Lane, Aitken & Kananen

[57] ABSTRACT

A multicolor image printing device composed of a micro-reticulated resin containing different colors of ink which are selected to correspond with the image being printed by a scanning device coupled to a digitizer.

In one embodiment a plurality of small resin pieces are preimpregnated with ink and then arranged in an array to form the image printing device.

In another embodiment the resin is an integral piece and the ink is injected therein at the desired locations. The methods and apparatus of making and using both embodiments are disclosed.

36 Claims, 5 Drawing Figures

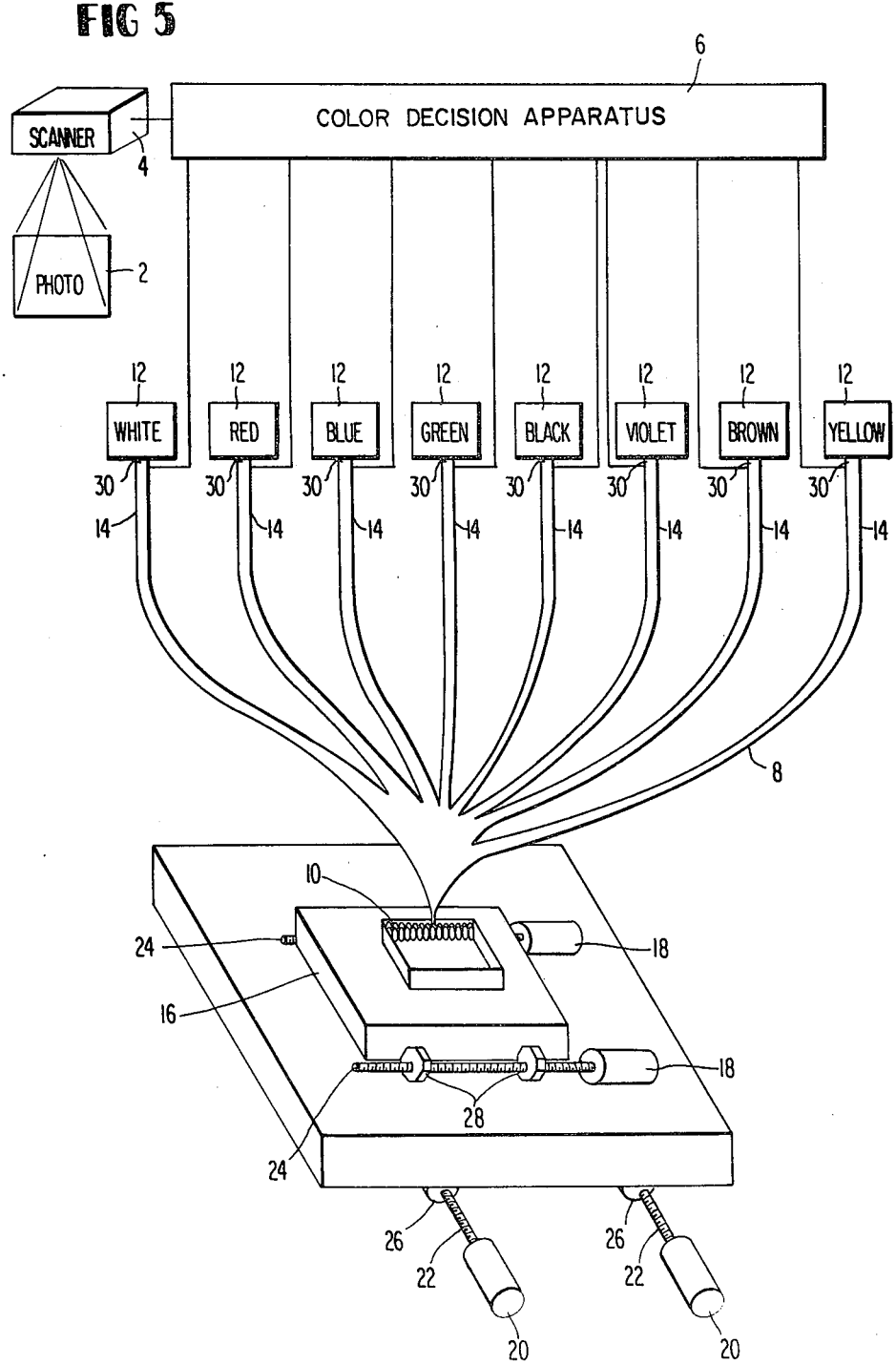

MULTICOLOR IMAGE PRINTING DEVICE AND METHOD

This application is a continuation of application Ser. No. 195,281, filed Oct. 8, 1980, which is a division of application Ser. No. 085,665, filed Oct. 17, 1979, both abandoned.

BACKGROUND OF THE INVENTION

The present invention relates to multicolor image printing devices, apparatus and manufacturing methods.

One application of the printing device covered by this invention is in business transactions where the physical appearance of buyers and sellers could desirably be recorded on documents arising out of the business transaction. In particular, a person purchasing articles in commercial establishments by a bank check could more readily have the check accepted if a photographic image of the purchaser appeared on the check, thus providing positive identification of the check writer. Other applications could include credit card acquisitions, and any other commercial transaction where recordation of the participant's identity is involved.

Another desirable application of such a device would be esthetic, as for example, displaying one's image inexpensively on personal stationery. Other applications could include affixing one's identity to personal articles so that if it is lost a finder could easily identify the true owner.

Until now, affixation of such personal photographic identification has been impractical. While photographs of an individual may be printed in large quantities for attachment to documents and other item requiring individual identification, these photographs are expensive, and subject to removal or mutilation.

Consequently, it is desired to produce a portable, economical, convenient, and efficient image printing device by which one can permanently affix a photographic image to any flat surface.

Self-inking stamp pads are known, as revealed by Leeds U.S. Pat. Nos. 2,777,824; 2,919,645; 3,055,297 and 3,141,407 as well as Hansen 3,971,315. These patents disclose the use of microporous, microreticulated resin material for use in making hand stamp printing devices. These patents also disclose structures for making ink receptive stamping material molded to form characters and images of a single color when utilized as stamping devices. None of the patents contain any means for making multicolor images, nor do they provide an easy, inexpensive method of recreating photographic images. Leeds U.S. Pat. No. 3,141,407 is capable of making half-tone printings, but the process involved not only is cumbersome, but expensive, and the method contemplates printing with only one color.

SUMMARY OF THE INVENTION

The invention includes the use of a scanning device to ascertain color values at a predetermined number of locations, and then to compose a microreticulated structure in accordance with the representation scanned, so that the mirror image of the representation to be printed appears on the composed microreticulated structure. The microreticulated structure, when used as a stamping device, will faithfully reproduce the photographic image up to 200,000 times.

In one embodiment of the invention a computer ascertains color values for each position of a matrix pattern by synthesizing the color information in areas of the representation scanned corresponding to the matrix positions. The color values for the matrix are used to select one of several predetermined colors available to a mechanism for assembling the hand stamp. A sequential distribution network then assembles color modules from a plurality of hoppers containing microreticulated resin modules. Each hopper contains a multitude of pieces of a particular color. The sequential network arranges the microreticulated pieces according to the matrix scanned from the representation. When the array of modules is completed, the pieces are bound together and a handle is attached to the assemblage to provide a portable, self-inking hand stamp.

An alternative embodiment includes the use of the same scanning device and computer, but in lieu of the sequential distribution network and hoppers, a block of microreticulated resin of the desired size conforming to the product is used. The block of resin has an internal honeycomb structure resulting in sealed chambers corresponding to the matrix. Ink is injected into each chamber of the block, with the colors of the injected ink corresponding to the color value for that matrix position.

The present invention includes not only the apparatus, but also the method to make the hand stamp as well as printing method.

BRIEF DESCRIPTION OF THE DRAWINGS

FIG. 5 is a block diagram of the apparatus similar to FIG. 1 but showing an alternate logic arrangement.

DESCRIPTION OF THE PREFERRED EMBODIMENT

The preferred embodiment of the present hand stamp invention includes the use of a microporous resinous stamping material of the type disclosed in the Leeds and Hansen patents. The microreticulated resin revealed in these patents has interconnected aggregates of the thermoplastic resins with interstices, forming a microporous network. The pores formed by the resin are filled with a fluid as the resin is formed. The fluid can be the ultimate marking ink, or it can be some other fluid which is later removed resulting in a porous structure having cavities filled only with air.

In a first embodiment, the present invention uses the microreticulated resin formation method in which the ultimate marking fluid is used in the formation of the microreticulated resin. The resin is made into elongate printing modules of uniform cross section. The modules are made sufficiently long to provide an adequate ink supply for the desired number of stampings. According to Hansen, by using a combination microporous/macroporous structure, up to 200,000 stampings can be achieved.

The modules should have a cross section as small as possible, because the smaller the cross section, the greater the image resolution available in the finished product. Diameters for the cross section of the cylindrical modules can range from 1/50th of an inch to 1/100th inch. With modules 1/100 inch size, a 1 inch square stamp can print 10,000 points of color information. The modules are provided with an outer coating to seal the ink inside during the assembly process, and to prevent bleed in the finished product.

The microreticulated resin modules are formed in various batches, with each batch being formed with a different color of ink in the porous cavities. Any number of colors (thus batches) can be used in making microreticulated resin modules. Increasing the number of colors used will increase the fidelity of the printing mechanism as well as increase the complexity and cost of the required mechanism. Thus, the number of different colors employed is merely a matter of commercial choice. Also, the colors chosen and their number should coincide with the sensitivity of the color decision apparatus discussed below.

Figure 1:
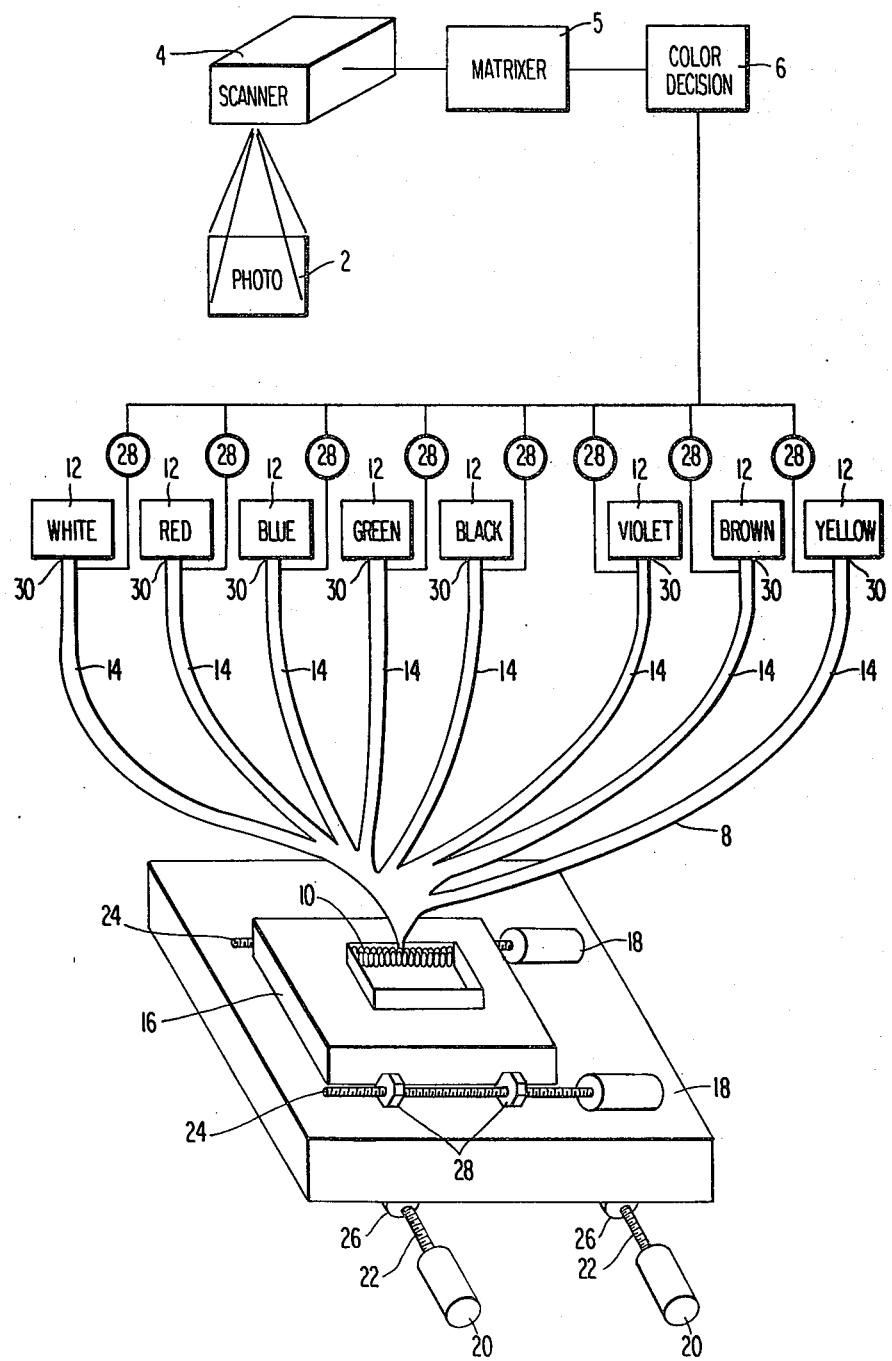
FIG. 1 is a block diagram of the apparatus used in one embodiment to make a hand stamp according to the present invention.
Figure 2:
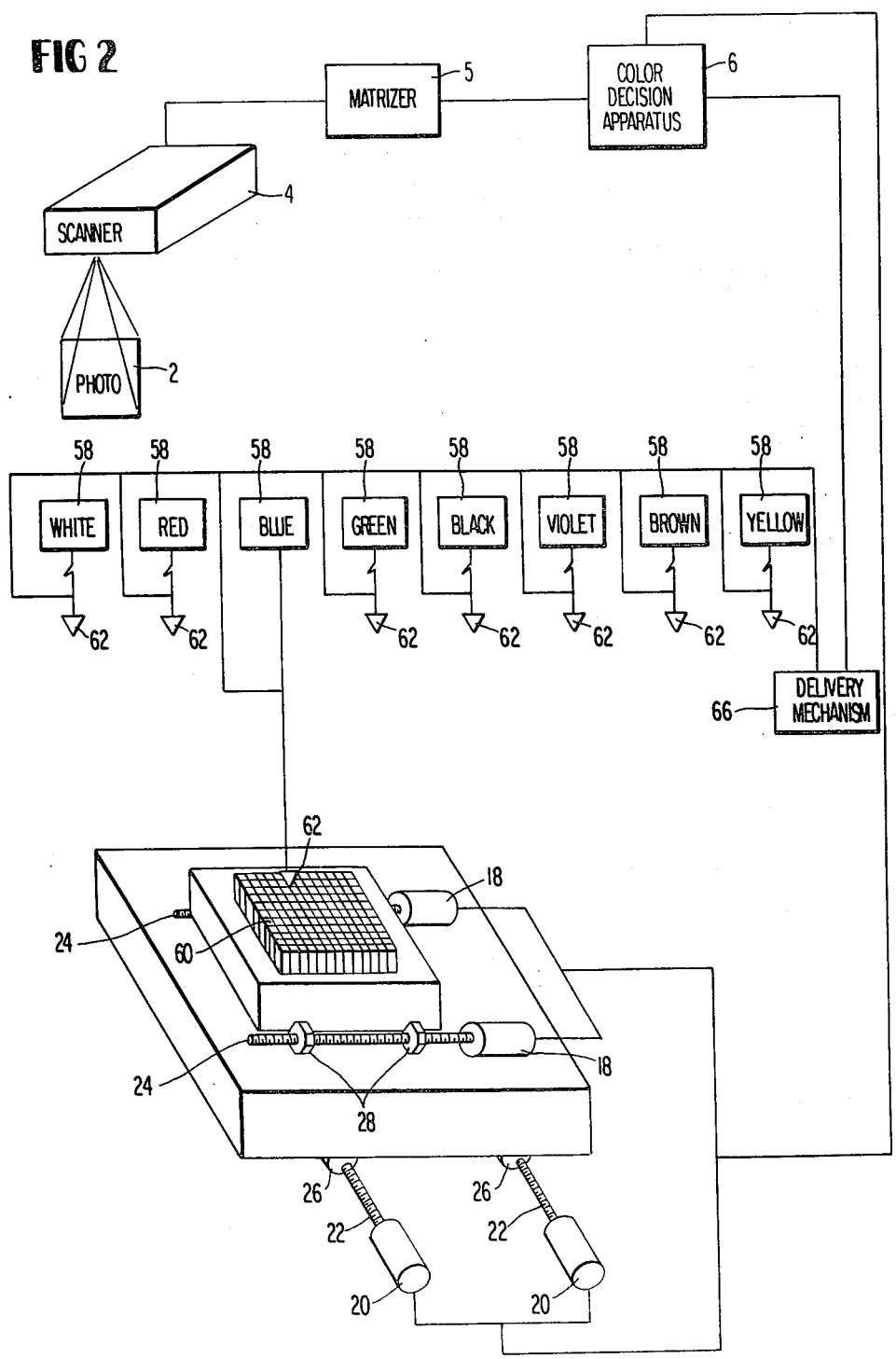
FIG. 2 is a block diagram of a second embodiment of apparatus for making a hand stamp according to the present invention.

The scanning device can be of any of the well-known color identifying types. As shown in FIGS. 1 and 2, photograph 2 to be duplicated in the hand stamp is placed under the scanning means or mechanism 4 which scans the photograph to determine color values at a multiplicity of locations of the photograph. The scanner ascertains a color value for a plurality of positions of the photograph. If the number of such positions exceeds the number of module positions available, a color selection means moving a logic circuit such as a matrixer 5 and an averaging means can be provided to generate an average color signal for each position of a matrix corresponding to various positions on the photograph. This signal is then applied to the color decision apparatus which determines the most appropriate color avalable from the preselected and preformed microreticulated resin modules to generate a color decision signal. The color decision signal is then applied to a distributing means 8 which delivers an appropriately colored microreticulated resin module 10 from the appropriate color bank or hopper 12 to the stamp assembly. The stamp assembly is moved in syncronization with the addressing of the matrix positions so that the distributed module falls into the appropriate location in the array of modules being assembled. When the entire photograph has been scanned and matrixed, and modules from the hoppers have been used to fill the stamp assembly, the modules are bound together and provided with a housing and a handle. The exposed face of the modules is ground to remove the sealing coating so that the ink can be released upon contact of the assembly with the desired surface.

In a particularly advantageous embodiment, the scanner can be a conventional color television camera, scanning the representation to be copied in a raster scan pattern., The signal generated by the television camera will usually be too detailed to allow all bits of color information included therein to be recreated in the printing mechanism of this invention, thus requiring a matrixer. Suitable matrixers include known television signal synthesizing devices which can digitize the television signal to derive values for matrix positions corresponding to the number of matrix positions available in the hand stamp assembly. One such system is the DeAnza System IP 5000 SERIES IMAGE ARRAY PROCESSOR AND DISPLAY SYSTEM, manufactured by DeAnza Systems, Inc., 3444 De LaCruz Boulevard, Santa Clara, California 95050.

The signal output of the digitizer will be a color signal average of the color signals that the television camera generated in scanning the area of the representation corresponding to the matrix position.

It is understood that alternate means could be used to derive the matrix of color values for the hand stamp modules of this invention. For instance, a television signal could be generated with only selected portions of the signal being sampled to derive a usable color signal for the hand stamp assembly.

In operation, the color decision apparatus can compare the signal from the matrixer with predetermined ranges of color signal values in a color recognition means such as a read only memory.

The distribution network includes composing means having a series of chutes 14 leading from the hopper 12 to the stamp assembly platform 16. The hoppers and chutes are oriented so that all of the chutes are of the same length (not shown) so that the travel time for each module from its hopper to the assembly platform is the same. Thus, the sequence of the modules' release from the hoppers is the same as the sequence of their arrival at platform 16.

Platform 16 can be driven in synchronization with the addressing of the matrix by applying appropriate driving signals to motors 18 and 20 which cause platform 16 to expose sequentially the various array positions in the stamp assembly by the rotation of threaded rods 22 and 24 in threaded bearings 26 and 28. Other apparatus can be used to expose array positions for the receipt of distributed modules.

The release of a module 10 from a hopper 12 can be activated by a signal directly from color decision apparatus 6 to that hopper only, by using the logic shown in FIG. 5. Alternatively the same signal can be applied to all hoppers, each having a filter 28 to pass the signal to the module release mechanism 30 only when the applied signal corresponds to the color of modules in that hopper, as shown in FIG. 1.

An alternative embodiment of the present invention also uses the microreticulated resin of the Leeds and Hansen patents. However, the resin of this embodiment is formed into a block the size of the finished stamp and has an internal honeycomb structure corresponding with the borders of the matrix positions. The honeycomb structure can be any material which will prevent the ink from bleeding between adjacent chambers of the honeycomb. Ink is not used in the initial formation of the resin block 60, but rather a non-solvent for the resin which can be driven off from the microreticulated resin structure after it has set. The result is a dry honeycomb device which can be then impregnated with ink as desired.

This embodiment uses the same scanner 4, matrixer 5 and color decision apparatus 6 of the first embodiment. However, the signal from the color decision apparatus is used to decide which of several color injection means such as needles 62 will provide the ink to each chamber of resin in the honeycomb block 60. The needle are provided with a structure similar to a hypodermic needle, so that ink from reservoirs 58 can flow through them when they have been inserted into the microreticulated resin material. The color decision apparatus (designation means) determines which ink injection needle should be inserted into the corresponding matrix section of the honeycombed microreticulated resin. The resin is moved by a moving means as before to allow each honeycomb chamber to receive a needle as each portion of the matrix is addressed. The ink is then injected through the hollow needles into the microreticulated resin, thus saturating the chamber with the desired color. Once saturated, the needle is withdrawn and the next honeycomb chamber is oriented to receive a needle.

Each needle is moved from a quiescent location to the injecting location within a matrix position of the honeycomb by a delivery means 66 (only one shown). Since the honeycomb moves in syncronization with the matrix address sequence, the injection location is always the same for every needle. The logic for activating the delivery mechanisms can be analogous to that of the first embodiment, that is, either a signal is applied to only one delivery mechanism directly from the color decision apparatus, or the color decision signal is applied to all delivery mechanisms but is filtered to result in the delivery of only one needle.

Figure 3:
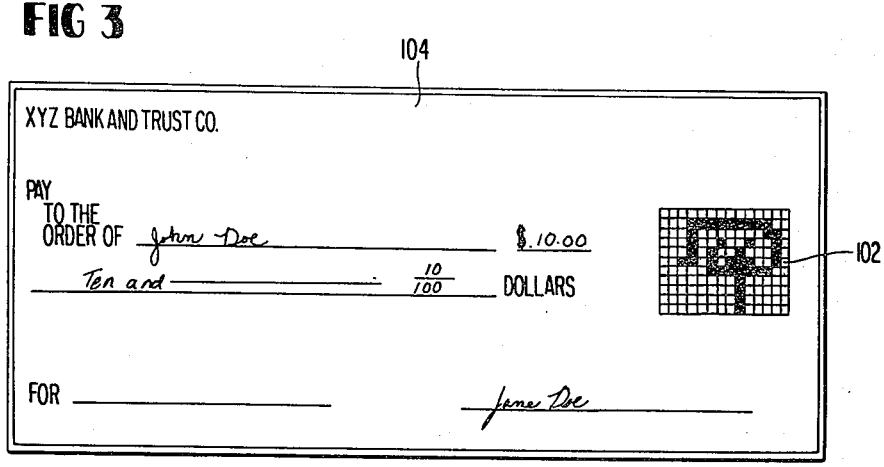
FIG. 3 is an example of a bank check bearing an imprint made by a hand stamp of the present invention.
Figure 4:
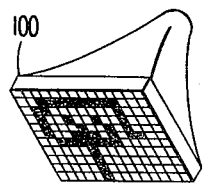
FIG. 4 is a perspective view of a completed hand stamp according to the present invention used to make the image shown on the check in FIG. 3.

Once the desired stamps have been formed, they can be used repeatedly, as long as the ink supply remains. All that need be done to print an image on a surface is to touch the stamp device to the surface, and the ink will flow, resulting in an image corresponding to the representation originally scanned. A completed stamp 100 shown schematically in FIG. 4 can be used to print the picture 102 of the appearance of a person on a bank check 104 as shown schematically in FIG. 3.

The resolution of the resulting image will depend on the size of the modules (if the first embodiment is used) or the size of the honeycomb chambers (if the second embodiment is used) and the corresponding resolution of the scanner and matrixer.

While in the foregoing specification, this invention has been described in relation to certain preferred embodiments, and details have been set forth for the purpose of illustration, it will be apparent that the invention is susceptible to additional embodiments and varied considerably without departing from the basic concept of this invention.

What is claimed is:

1. An apparatus for making a color image printing device comprising a scanning means for scanning the representation to be printed and generating a scanning signal responsive thereto;
   a color selection means having an input means for receiving said scanning signal and means responsive to said scanning signal to generate a color selection signal corresponding to the color of a portion of the scanned representation;
   a plurality of color banks each holding a plurality of printing modules comprising ink of a single color, and each having distributing means responsive to said color selection signal to distribute one of said modules when said color selection signal corresponds to the color of printing modules held therein;
   a composing means to compose said distributed modules into an array of modules; and
   a binding means for binding said array whereby said bound array can be applied to a surface and the ink in said printing modules will produce at least one image corresponding to said representation.

2. An apparatus as claimed in claim 1, said printing modules comprising a microreticulated thermoplastic resin and printing ink.

3. An apparatus as claimed in claim 2, said printing modules having an outer seal to prevent said ink from leaking, and said apparatus further comprising means for removing a portion of said outer coating from said modules after they have been composed into said array.

4. An apparatus as claimed in claim 2, said scanning means scanning said representation in a television raster scan-like pattern.

5. An apparatus as claimed in claim 4, said scanning means comprising a television camera.

6. An apparatus as claimed in claim 4, said color selection means comprising a logic circuit to convert said scanning signal into a matrix of signals corresponding to a matrix of positions defining the area of said representation and averaging means for generating an average color determination signal for each position in said matrix, and a decision means for generating said color selection signal responsive to said average color determination signal.

7. An apparatus as claimed in claim 6, said decision means comprising a plurality of filter means corresponding to the plurality of color banks, each filter means passing a color selection signal to said distributing means of said color banks only when said average color determination signal corresponds to the color in said color bank.

8. An apparatus as claimed in claim 6, said decision means comprising a color recognition means for recognizing the color indicated by the average color determination signal and for applying said color selection signal to the color bank distributing means corresponding thereto.

9. An apparatus as claimed in claim 4, said composing means comprising a distribution network for receiving said distributed modules and maintaining them in the order of their distribution thereto;
   a frame for receiving said modules from said distribution network;
   means for moving said frame to arrange said modules in said frame to form said array to correspond to the representation scanned by said scanning means.

10. An apparatus for making a printing device comprising a scanning means for scanning the representation to be printed and generating a scanning signal responsive thereto;
    a color selection means responsive to said scanning signal to generate a color selection signal corresponding to the color of a portion of the scanned representation;
    a block of ink absorbing material;
    a plurality of color injection means for injecting ink into said block of ink absorbing material; and
    delivery means responsive to said color selection signal to deliver said color selection means to a portion of said block of ink absorbing material to inject ink therein to form a pattern of ink injections in said block, said pattern corresponding to the scanned representation so that the block can be applied to a surface to print at least one image of said representation.

11. An apparatus as claimed in claim 10, said block of ink absorbing material comprising a block of microreticulated resin.

12. An apparatus as claimed in claim 11, said microreticulated resin having sealed apart chambers therein to prevent different colors of injected inks from inter-mixing.

13. An apparatus as claimed in claim 11, said scanning means scanning said representation in a television raster scan-like pattern.

14. An apparatus as claimed in claim 11, said scanning means comprising a television camera.

15. An apparatus as claimed in claim 13, said color selection means comprising
a logic circuit to convert said scanning signal into a matrix of signals corresponding to a matrix of positions defining the area of said representation; and
averaging means for generating an average color determination signal for each position in said matrix.

16. An apparatus as claimed in claim 15, said delivery means comprising a filter means responsive to said color selection signal for activating said delivery means only when said color selection signal corresponds to the color in said color injection means.

17. An apparatus as claimed in claim 15, said detection means comprising a color recognition means for recognizing the color indicated by the average color determination signal and for applying said color selection signal to the delivery means for delivery of said color injection means corresponding thereto.

18. An apparatus as claimed in claim 13, said delivery means comprising designation means for designating the ink injection means corresponding to the colorselection signal and for orienting the designated injection means for injecting; and moving means for moving said block of ink absorbing material so that said designated color injection means injects ink into said ink absorbing material to form said pattern corresponding to the representation scanned by said scanning means.

19. A method of making a color image printing device comprising the steps of: scanning the representation to be printed and generating a scanning signal responsive thereto;
generating a color selection signal corresponding to the color of a portion of the scanned representation; providing a plurality of color banks each holding a plurality of printing modules comprising ink of a single color;
distributing a printing module from one of said plurality of color banks when said color selection signal corresponds to the color of printing modules held in the color bank;
composing said distributed modules into an array of modules; and
binding said array;
whereby said bound array can be applied to a surface and the ink in said printing modules will produce at least one image corresponding to said representation.

20. A method as claimed in claim 19 including providing said printing modules as microreticulated thermoplastic resin and printing ink.

21. A method as claimed in claim 20 including sealing said printing modules with an outer seal to prevent said ink from leaking, and removing a portion of said outer coating from said modules after they have been composed into said array.

22. A method as claimed in claim 20, said scanning step including scanning said representation in a television raster scan-like pattern.

23. A method as claimed in claim 22, said scanning step including scanning said representation with a television camera.

24. A method as claimed in claim 22, said step of generating a color selection signal comprising converting said scanning signal into a matrix of signals corresponding to a matrix of positions defining the area of said representation;
generating an average color determination signal for each position in said matrix; and
generating said color selection signal responsive to said average color determination signal.

25. A method as claimed in claim 24 comprising filtering said color selection signal at each of said color banks to pass said color selection signal and thereby distribute one of said printing modules only when said color selection signal corresponds to the color in said color bank.

26. A method as claimed in claim 24, said step of generating said color selection signal comprising recognizing the color indicated by the average color determination signal and applying said color selection signal to the color bank corresponding thereto, to effect distribution of a printing module therefrom.

27. A method as claimed in claim 22, said composing step comprising providing a frame for receiving said modules as they are distributed;
receiving said distributed modules and maintaining them in the order of their distribution;
moving said frame to arrange said modules in said frame to form said array to correspond to the representation scanned by said scanning means.

28. A method of making a printing device comprising scanning the representation to be printed and generating a scanning signal responsive thereto;
generating a color selection signal responsive to said scanning signal corresponding to the color of a portion of the scanned representation;
providing a block of ink absorbing material;
injecting ink into a portion of said block of ink absorbing material responsive to said color selection signal to form a pattern of ink injections in said block,
said pattern corresponding to the scanned representation so that the block can be applied to a surface to print at least one image of said representation.

29. A method as claimed in claim 28 comprising making said block of ink absorbing material of microreticulated resin.

30. A method as claimed in claim 29 comprising making sealed apart chambers in said block to prevent different colors of injected inks from inter-mixing.

31. A method as claimed in claim 29, said scanning step including scanning said representation in a television raster scan-like pattern.

32. A method as claimed in claim 30, said scanning step including scanning said representation with a television camera.

33. A method as claimed in claim 31 comprising converting said scanning signal into a matrix of signals corresponding to a matrix of positions defining areas of said representation; and
generating said color selection signal for each position in said matrix.

34. A method as claimed in claim 33 comprising filtering said color selection signal so that said step of injecting said ink into said block occurs only when said color selection signal corresponds to the color of ink to be injected.

35. A method as claimed in claim 31 comprising recognizing the color indicated by the average color determination signal and injecting said ink into said block if the color of said ink corresponds thereto.

36. A method as claimed in claim 31 comprising moving said block of ink absorbing material and injecting said ink into said ink absorbing material to form said pattern corresponding to the representation scanned.

* * * * *

UNITED STATES PATENT AND TRADEMARK OFFICE
CERTIFICATE OF CORRECTION

PATENT NO. : 4,481,528

DATED : November 6, 1984

INVENTOR(S) : Richard M. Peck

It is certified that error appears in the above-identified patent and that said Letters Patent is hereby corrected as shown below:

Column 1, line 58, after "The" (first occurrence) insert -- present -- .

Column 2, line 19, after "the" (first occurrence) insert -- final -- .

Column 3, line 62 after "derive" insert -- color -- .

Column 6, line 52, delete "selection" and insert therefor -- injection -- .

Column 7, lines 16 and 17, delete "detection" and insert therefor -- decision -- .

Signed and Sealed this

Twenty-third Day of April 1985

[SEAL]

Attest:

DONALD J. QUIGG

*Attesting Officer*     *Acting Commissioner of Patents and Trademarks*

Disclaimer and Dedication 4,481,528—*Richard M. Peck*, Allentown Pa. MULTICOLOR IMAGE PRINTING DEVICE AND METHOD.Patent dated Nov. 6, 1984. Disclaimer and Dedication filed Dec. 7, 1990, by the inventor.

Hereby disclaims and dedicates to the public the remaining term of said patent.
[ *Official Gazette June 4, 1991* ]